(12) United States Patent
Matusik et al.

(10) Patent No.: US 10,850,495 B2
(45) Date of Patent: Dec. 1, 2020

(54) TOPOLOGY OPTIMIZATION WITH MICROSTRUCTURES

(71) Applicant: Massachusetts Institute of Technology, Cambridge, MA (US)

(72) Inventors: Wojciech Matusik, Lexington, MA (US); Desai Chen, Malden, MA (US); Melina Skouras, Cambridge, MA (US); Bo Zhu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 755 days.

(21) Appl. No.: 15/418,528

(22) Filed: Jan. 27, 2017

(65) Prior Publication Data

US 2019/0001657 A1    Jan. 3, 2019

Related U.S. Application Data

(60) Provisional application No. 62/288,766, filed on Jan. 29, 2016.

(51) Int. Cl.
*B33Y 50/00* (2015.01)
*B33Y 10/00* (2015.01)
(Continued)

(52) U.S. Cl.
CPC ............ *B33Y 50/00* (2014.12); *B29C 64/386* (2017.08); *B33Y 10/00* (2014.12); *G06F 30/00* (2020.01);
(Continued)

(58) Field of Classification Search
CPC ........ B33Y 50/00; B29C 64/386; G06F 17/50
(Continued)

(56) References Cited

U.S. PATENT DOCUMENTS 7,848,838 B2 * 12/2010 Gershenfeld .......... B33Y 50/02
                                                                 700/118
9,287,713 B2 * 3/2016 Sharon .............. H02J 13/00028
                                                                    13/28

(Continued)

OTHER PUBLICATIONS

Yan et al. ("Concurrent topology optimization of structures and their composite microstructures", Elsevier, 2013, pp. 103-110) (Year: 2014).*

(Continued)

*Primary Examiner* — Iftekhar A Khan
(74) *Attorney, Agent, or Firm* — Wolf, Greenfield & Sacks, P.C.

(57) ABSTRACT

System and method for optimizing a three-dimensional model representing a shape of an object to be fabricated from a plurality of materials having known physical properties. The object is designed to exhibit one or more target properties and the three-dimensional model includes a plurality of cells. The system includes at least one processor programmed to receive a data structure including information for a material property gamut of microstructures for the plurality of materials and two or more of the known physical properties of the plurality of materials, and perform a topology optimization process on the three-dimensional model to generate an optimized model, wherein the topology optimization process is constrained based, at least in part, on the information in the received data structure and the one or more target properties.

20 Claims, 12 Drawing Sheets

(51) Int. Cl.
  *G06F 30/00* (2020.01)
  *G06F 30/23* (2020.01)
  *B29C 64/386* (2017.01)
  *G06F 119/18* (2020.01)

(52) U.S. Cl.
  CPC .......... *G06F 30/23* (2020.01); *G06F 2119/18* (2020.01)

(58) Field of Classification Search
  USPC .......................................................... 703/1
  See application file for complete search history.

(56) References Cited

U.S. PATENT DOCUMENTS

| | | | | |
|---|---|---|---|---|
| 9,767,226 | B2* | 9/2017 | Chen | G06T 17/00 |
| 9,855,698 | B2* | 1/2018 | Perez | B29C 48/865 |
| 9,895,845 | B2* | 2/2018 | Bheda | B29C 64/386 |
| 10,052,824 | B2* | 8/2018 | Erb | B29C 64/10 |
| 10,190,955 | B2* | 1/2019 | Hossain | G01N 3/40 |
| 10,423,739 | B2* | 9/2019 | Nomura | G06F 17/11 |
| 10,556,418 | B2* | 2/2020 | Bastian | G06F 30/00 |
| 10,635,088 | B1* | 4/2020 | Bandara | B33Y 50/00 |
| 2007/0239411 | A1* | 10/2007 | Yamashita | G06F 30/23 703/7 |
| 2009/0021513 | A1* | 1/2009 | Joshi | G06T 15/005 345/419 |
| 2010/0262406 | A1* | 10/2010 | Goel | G06F 30/23 703/2 |
| 2010/0277477 | A1* | 11/2010 | Wang | G06T 15/506 345/426 |
| 2010/0296724 | A1* | 11/2010 | Chang | G06T 7/75 382/154 |
| 2011/0270587 | A1* | 11/2011 | Yamada | G06F 30/17 703/1 |
| 2012/0058174 | A1* | 3/2012 | West | A61L 27/56 424/443 |
| 2012/0255663 | A1* | 10/2012 | Holroyd | B33Y 50/00 156/64 |
| 2012/0327086 | A1* | 12/2012 | Shimbaru | G06T 15/80 345/427 |
| 2014/0214370 | A1* | 7/2014 | Olhofer | G06F 30/00 703/1 |
| 2014/0277669 | A1* | 9/2014 | Nardi | G05B 19/042 700/103 |
| 2014/0324204 | A1* | 10/2014 | Vidimce | B29C 64/386 700/98 |
| 2015/0066440 | A1* | 3/2015 | Chen | G06F 30/00 703/1 |
| 2015/0079327 | A1* | 3/2015 | Kautz | B33Y 50/02 428/64.1 |
| 2015/0190971 | A1* | 7/2015 | Musuvathy | B29C 64/386 700/98 |
| 2015/0360288 | A1* | 12/2015 | Zalewski | B22F 3/16 419/38 |
| 2016/0096318 | A1* | 4/2016 | Bickel | B29C 64/00 264/40.1 |
| 2016/0101570 | A1* | 4/2016 | Iorio | G05B 19/4099 700/98 |
| 2016/0136896 | A1* | 5/2016 | Wighton | B33Y 50/00 700/120 |
| 2016/0167306 | A1* | 6/2016 | Vidimce | G06F 30/00 264/40.1 |
| 2016/0184893 | A1* | 6/2016 | Dave | B29C 64/153 419/53 |
| 2017/0023084 | A1* | 1/2017 | Guest | F16F 1/37 |
| 2018/0154484 | A1* | 6/2018 | Hall | B23K 26/342 |
| 2018/0186460 | A1* | 7/2018 | Dardona | C23C 4/12 |
| 2018/0276889 | A1* | 9/2018 | Zagade | B29C 64/386 |
| 2018/0330029 | A1* | 11/2018 | Pedersen | G06F 30/23 |
| 2019/0001657 | A1* | 1/2019 | Matusik | B33Y 50/00 |
| 2019/0026415 | A1* | 1/2019 | Han | G06F 30/17 |
| 2019/0270252 | A1* | 9/2019 | Iorio | B29C 64/386 |

OTHER PUBLICATIONS

Alexandersen et al. ("Topology optimisation of manufacturable microstructural details without length scale separation using a spectral coarse basis preconditioner", Comput. Methods Appl. Mech. Engrg. 290 (2015) 156-182) (Year: 2015).*

Bhattacharya et al. ("A Level-Set Method for Skinning Animated Particle Data",IEEE Transactions on Visualization and Computer Graphics, vol. 21, No. 3, Mar. 2015) (Year: 2015).*

Gao et al. ("Topology optimization for multiscale design of porous composites with multi-domain microstructures", Elsevier B.V., 2018, pp. 451-476) (Year: 2018).*

Alexandersen et al. ("Topology optimization of manufacturable microstructural details without length scale separation using a spectral coarse basis preconditioner", Elsevier B.V., 2015, pp. 156-182) (Year: 2015).*

Huang et al. ("Topology optimization of microstructures of cellular materials and composites for nnacrostructures", Elsevier B.V. 2012, pp. 397-407) (Year: 2012).*

Mirzendehdel et al. ("Support structure constrained topology optimization for additive manufacturing", Elsevier B.V. 2016, pp. 1-13) (Year: 2016).*

International Search Report and Written Opinion for International Application No. PCT/US2017/015462 dated Oct. 2, 2017.

International Preliminary Report on Patentability dated Aug. 9, 2018 in connection with International Application No. PCT/US2017/015462.

* cited by examiner

TOPOLOGY OPTIMIZATION WITH MICROSTRUCTURES

RELATE APPLICATIONS

The present application claims the benefit of U.S. Provisional Patent Application No. 62/288,766, Jan. 29, 2016, titled "Topology Optimization with Microstructures," which is hereby incorporated by reference in its entirety.

STATEMENT REGARDING FEDERALLY SPONSORED RESEARCH OR DEVELOPMENT

This invention was made with Government support under Grant No. CCF-1533753 awarded by the National Science Foundation and Contract No. N66001-15-C-4030 awarded by the Space and Naval Warfare Systems Center. The Government has certain rights in the invention."

BACKGROUND

Additive fabrication, e.g., 3-dimensional (3D) printing, provides techniques for fabricating objects, typically by causing portions of a building material to solidify and/or combine at specific locations. Additive fabrication techniques may include stereolithography, selective or fused deposition modeling, direct composite manufacturing, laminated object manufacturing, selective phase area deposition, multi-phase jet solidification, ballistic particle manufacturing, particle deposition, laser sintering, polyjet, or combinations thereof. Many additive fabrication techniques build parts by forming successive layers, which are typically cross-sections of the desired object. Typically each layer is formed such that it adheres to either a previously formed layer or a substrate upon which the object is built.

SUMMARY

Some embodiments are directed to a system for optimizing a three-dimensional model representing a shape of an object to be fabricated from a plurality of materials having known physical properties, wherein the object is designed to exhibit one or more target properties, wherein the three-dimensional model includes a plurality of cells. The system comprises at least one processor configured to receive a data structure including information for a material property gamut of microstructures for the plurality of materials and two or more of the known physical properties of the plurality of materials and perform a topology optimization process on the three-dimensional model to generate an optimized model, wherein the topology optimization process is constrained based, at least in part, on the information in the received data structure and the one or more target properties.

Other embodiments are directed to a non-transitory computer-readable medium comprising instructions that, when executed, perform a method of optimizing a three-dimensional model representing a shape of an object to be fabricated from a plurality of materials having known physical properties, wherein the object is designed to exhibit one or more target properties, wherein the three-dimensional model includes a plurality of cells. The method comprises receiving a data structure including information for a material property gamut of microstructures for the plurality of materials and two or more of the known physical properties of the plurality of materials, and performing a topology optimization process on the three-dimensional model to generate an optimized model, wherein the topology optimization process is constrained based, at least in part, on the information in the received data structure and the one or more target properties.

Other embodiments are directed to a method of optimizing a three-dimensional model representing a shape of an object to be fabricated from a plurality of materials having known physical properties, wherein the object is designed to exhibit one or more target properties, wherein the three-dimensional model includes a plurality of cells. The method comprises receiving a data structure including information for a material property gamut of microstructures for the plurality of materials and two or more of the known physical properties of the plurality of materials, and performing a topology optimization process on the three-dimensional model to generate an optimized model, wherein the topology optimization process is constrained based, at least in part, on the information in the received data structure and the one or more target properties.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
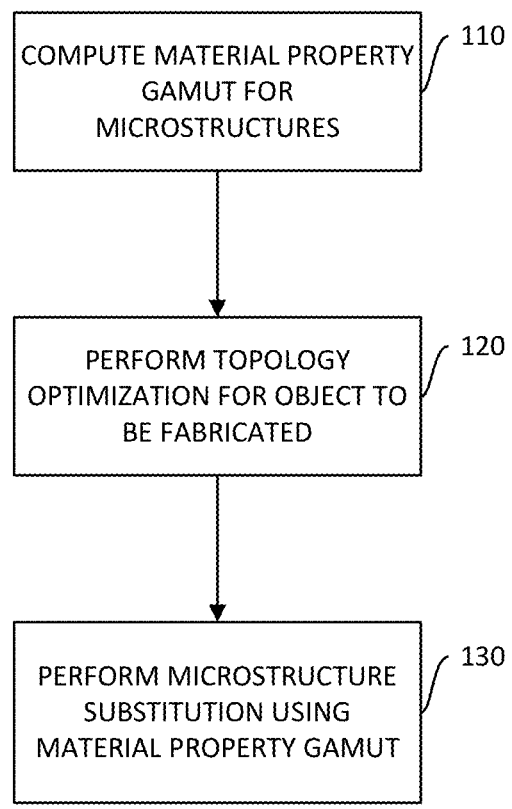
FIG. 1 illustrates a process for optimizing a design of an object in accordance with some embodiments.

Some additive fabrication techniques allow an object to be fabricated from more than one material. In order to instruct an additive fabrication device to fabricate an object from multiple materials, the types of materials may be specified for each part of the object prior to fabrication. For example, a designer of the object may use a software application to specify which regions of the object are to be fabricated from which of the available materials. The object may then be fabricated by depositing the specified material in each region during fabrication.

As the number of materials available for fabrication increases, however, the potential complexity in functional (e.g., mechanical, electrical, thermal, optical) characteristics of fabricated objects dramatically increases. When provided with a desired set of functional characteristics for a fabricated object, it can be both time consuming and, in some cases, difficult or impossible, for a user to specify which material should be deposited in each region of the object such that the object can be fabricated with the desired functional characteristics.

For example, to design an object that compresses a particular way when squeezed, a designer of the object may conventionally specify one or more materials with which to fabricate the object, and where those materials should be located in the fabricated object, so that the fabricated object exhibits the desired compression characteristics. The designer must consider the desired functional properties of a fabricated object and then decide how to put materials together so that in combination the materials make an object having those desired functional properties.

Some conventional approaches for determining a design of an object having a particular shape and functional characteristics often use computational frameworks, an example of which is topology optimization. In topology optimization, an object is discretized into small volume elements (voxels) and the material distribution over the voxels in the objects is optimized in such a way that the object is fabricated with the desired functional characteristics. For example, a material may be identified for each voxel in the object, and by determining which material should be chosen for each voxel, a composition for the entire object may be determined.

Recent multi-material 3D printing techniques provide the ability to design objects with multiple materials at high resolution (e.g., 600 DPI or more), resulting in improved functional performance of the objects. Conventional topology optimization techniques generally do not scale well and cannot practically be used to design objects with a large number (e.g., billions) of voxels since the number of variables to optimize increases linearly with the number of voxels in the object. For example, for a 3D printer having a resolution of 600 DPI, a one billion voxel design would occupy only a 1.67 inch cube. Designing larger objects at or near the resolution of the printer would require designs with billions of voxels, further adding to the complexity of the optimization problem. Some conventional techniques for dealing with this complexity include using lower resolution designs with larger voxels and using a non-uniform grid to model the object, resulting in a design with lower functional performance than desired.

The inventors have recognized and appreciated that conventional topology optimization techniques used with 3D printing applications may be improved by modeling the object to be fabricated using microstructures corresponding to groups of voxels rather than individual voxels. Previous attempts to use microstructures often decouple macro structural design and micro material design by ignoring the geometry of the microstructures and considering their macroscopic physical behavior instead. However, this approach introduces difficulties as the space of material properties covered by all possible printable microstructures is much wider than the properties of the base materials. For example, microstructures made of alternating layers of soft and stiff isotropic materials exhibit an anisotropic behavior as they are able to stretch more easily in one direction than in the others. This implies that not only the ranges but also the number of physical parameters needed to describe the physical behavior of the microstructures increases. Accordingly, some embodiments are directed to techniques for addressing, at least in part, two challenging problems of working with the material properties of microstructures: (i) computing the gamut of the material properties achievable by all microstructures and (ii) optimizing the distribution of the high-dimensional material properties inside the layout of an object to be fabricated in an efficient way.

Some embodiments are directed to a novel computational framework for topology optimization with microstructures that supports design spaces of multiple functional dimensions. The computational framework enables efficient optimization of high resolution modes that can be fabricated using multi-material 3D printing. FIG. 1 illustrates a diagram of a process for a computational framework in accordance with some embodiments. In act 110, a gamut of material properties for a set of microstructures is calculated. The material property gamut represents the space of bulk material properties that can be achieved with all material microstructures of a given size. In some embodiments, a precomputation process is used that efficiently samples the space of microstructures and their corresponding material properties to define a material property gamut. As discussed in more detail below, the gamut may be computed by alternating stochastic sampling and continuous optimization to provide a discrete representation of the material properties space from which a continuous representation of the gamut can be constructed, for example, using a level set field.

The process of FIG. 1 then proceeds to act 120, where topology optimization constrained by the parameters of the continuous gamut representation is performed to find optimal distributions of multiple material properties simultaneously inside the gamut. Using the gamut as a constraint in a generalized topology optimization framework enables the assignment of spatially varying material properties throughout the optimized object.

The process of FIG. 1 then proceeds to act 130, where the output of the topology optimization process is mapped onto the microstructures in the gamut computed in act 110 with corresponding properties to obtain a 3D model for the object that can be fabricated using 3D printing. Each of the acts in the process of FIG. 1 is described in more detail below.

Some embodiments are directed to determining the material distribution inside an object that optimizes functional objectives given an object layout and a set of base materials. Microstructures made of the base materials are used to compute a space or "gamut" of the physical material properties spanned by the microstructures. As used herein, the term microstructure refers to a small scale assembly made of one or more base materials that are used as low-level building blocks of an object to be fabricated. The macroscale properties of the microstructure may be very different from those of the original materials. Some aspects of the techniques described herein are directed to combining a probabilistic search and a continuous optimization to explore the gamut of material properties that microstructures that can be achieved by assembling given base materials.

Figure 2:
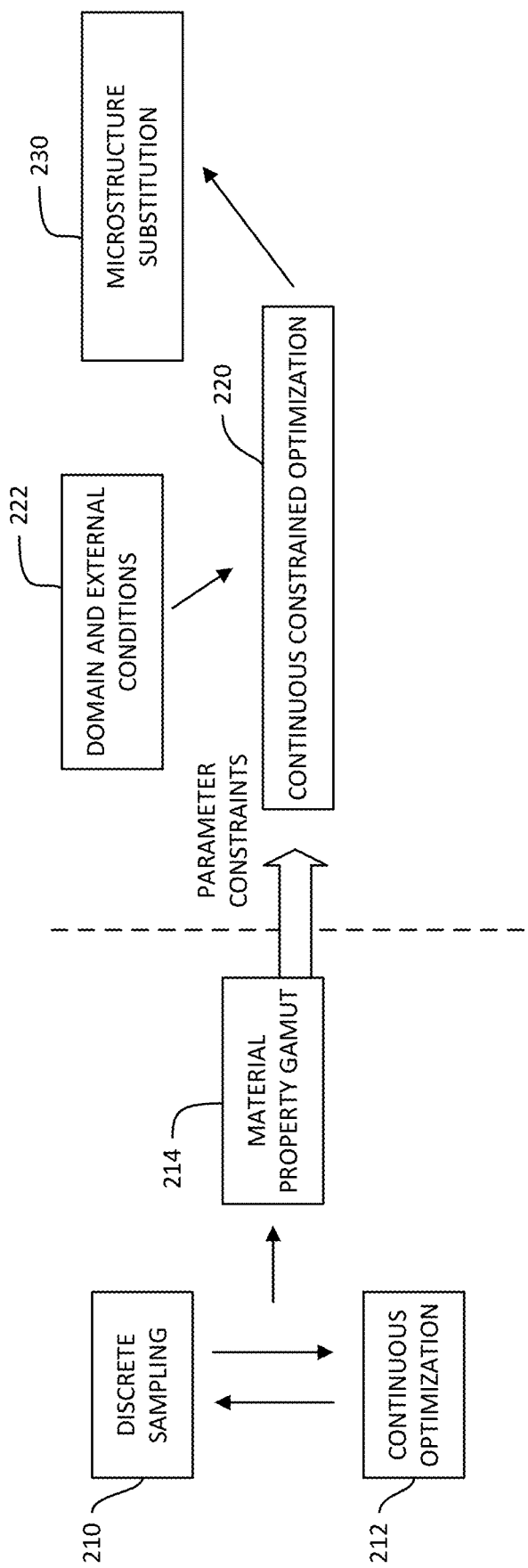
FIG. 2 illustrates detailed steps of the process of FIG. 1 in accordance with some embodiments.

FIG. 2 shows a schematic diagram of a process for determining a material distribution inside an object in accordance with some embodiments. In a first stage, the gamut of material properties covered by all possible microstructures of a predefined size and made by spatial arrangement of the base materials is estimated. In a second stage, the precomputed material property gamut is used to constrain a continuous topology optimization process to determine a physically realizable solution meeting desired functional characteristics. In a third stage, a 3D printable result is generated by replacing each voxel in the object layout with a microstructure having material properties closest to the continuous material assignment resulting from the optimization output from the second stage.

Regarding the first stage, computing the mechanical properties of microstructures, when arranged in periodic tilings, can be performed by probing the structure using a physical simulation based on the homogenization theory. While inferring the homogenized properties of individual microstructures is generally not computationally expensive, analyzing the space covered by all combinations of base materials is much more computationally complex due to the combinatorial explosion in the number of possible material arrangements. For example, a lattice of 16×16×16 voxels made up of only two materials corresponds to $2^{4096}$ microstructures, and exhaustively probing all microstructures in this space is computationally infeasible. To address this issue, some embodiments (i) sample the space of the microstructures using discrete sampling and (ii) rely on the continuity between material parameters of the individual voxels and macroscopic properties of the microstructures in order to generate new microstructures with desired properties.

The inventors have recognized that although using continuous optimization alone may be effective in reaching local optimal values in the material property space, the function that maps the material assignment to the material properties is nonlinear. In particular, very different microstructures can correspond to the same point in the material property space. Additionally, since the ratio of materials in each cell is bounded between zero and one, continuous optimization converges slowly or stops moving when material distributions in many voxels are at the lower or upper bound. Accordingly, being able to jump out of a local optimum and discovering different variants provided by the discrete sampling process is important to provide new exploration regions in the material property space. Accordingly, some embodiments leverage a discrete sampling process 210 and a continuous optimization process 212 by combining these techniques in a scheme that alternates between a stochastic search and a continuous optimization, as shown in FIG. 2 and as discussed in more detail below.

Discrete Sampling

In accordance with some embodiments, discrete sampling process 210 introduces discrete changes in the materials of the microstructures to allow for the emergence of new types of microstructures. Discrete sampling may be achieved by sampling the space of material assignments, i.e., microstructures, in such a way that maximizes the number of samples corresponding to microstructures having material properties located near the material property gamut boundaries. Rather than drawing all samples at once, a database of microstructures may be progressively enriched by refining the estimation of the material property gamut boundaries. The motivation behind this sampling strategy is the observation that a small change in the material assignment of a microstructure often translates to a small change of its material properties. By modifying microstructures located near the current boundary of the gamut, it is likely that more microstructures will be generated in this area of the gamut and some of those microstructures will lie outside the boundaries of the current gamut, thereby expanding the gamut when these microstructures are included in the database.

In some embodiments, a given microstructure is modified to generate new samples by changing the material properties at random voxel locations in the microstructure using a stochastically ordered sequential Monte Carlo (SOSMC) method. In the SOSMC method, a population of particles corresponding to an instance of a procedural program are evolved so as to represent a desired distribution. During this process the programs are executed in a random order and particles are regularly scored and reallocated in regions of high probability. For example, the scoring function:

$$s(p_i) = \frac{dist(p_i)}{\rho(p_i)} \times \frac{1}{\rho(p_i)} \qquad (1)$$

may be used in some embodiments, where $dist(p_i)$ measures the distance of the properties of the microstructure corresponding to the particle i to the boundary of the gamut and $\rho(p_i)$ is the local density of material points at the location $p_i$. The material point density may be defined as:

$$\rho(p_i) = \sum_k \phi_k(p_i) \qquad (2)$$

where $$\phi_k(p) = \left(1 - \frac{\|p - p_k\|_2^2}{h^2}\right)^4$$

are locally-supported kernel functions that vanish beyond their support radius h set to a tenth of the microstructure lattice size.

The first product in Eq. 1 favors microstructures located near the boundary of the gamut. The normalization by ρ allows to have the same probability to hit any location on the boundary. The second product in Eq. 1 is used to additionally privilege under-sampled areas of the gamut.

In some embodiments, particles are resampled using a systematic resampling scheme that is also used to initiate the population of particles. The particles may then be evolved in accordance with the following algorithm:

---
Example algorithm for generating new microstructures
---
procedure GENMICROSTRUCTURE(input: microstructure M, output: microstructure m)
    m ← M
    while some voxels of m have not been visited do
        while microstructure m is unchanged do
            pick a random voxel v of m that has not been visited yet
            swap material of v with probability 0.5
            if m is manifold and m ≠ M then
                accept the change
            end if
        end while
    end while
end procedure

---

Continuous Optimization

Alternating with discrete sampling process 210 is a continuous optimization process 212 that locally pushes the material space gamut boundaries by refining the microstructure shapes. In continuous optimization process 212, the material distribution at each location in the gamut is treated as a continuous variable enabling the formulation of continuous objective functions for exploring the material property space. A subset of microstructures from the discrete samples determined in the discrete sampling process 210 may be selected as starting points for the continuous optimization.

For a given microstructure close to the boundary of the gamut, the desired search direction may be determined using a level set field (or other suitable representation of the boundary of the gamut). The target material properties are then determined by moving the current properties along the search direction. For example, material properties for cubic microstructures are described by the Young's modulus E, Poisson's ratio $v$, shear modulus $\mu$, and average density $\rho$. These elasticity parameters may be translated into six desired harmonic displacements and stacked into a 6×6 matrix $G_0$. A goal of the continuous optimization process 212 is to match the target coarse displacement $G_0$ and the target density by changing the material distribution d at each cell. The objective function may be written as:

$$f(d)=(G(d)-G_0)^2+w_p(\rho-\rho_0) \qquad (3)$$

where $w_p$ controls the weighting between the displacement term and the density term.

The derivative of the objective function may then be computed using the adjoint method as follows: Let K(d) be the stiffness matrix controlled by the material distribution d. For a given external force $F_{ext}$, the displacements u of the fine degrees of freedom are $u=K(d)^{-1}F_{ext}$. Let g(u) be a scalar function that depends on the displacements, then its partial derivative with respect to the material distribution d' at the ith element is:

$$u = K^{-1}F_{ext}, \qquad (4)$$

$$\lambda = K^{-1}\frac{\partial g}{\partial u}, \qquad (5)$$

$$\frac{\partial g}{\partial d} = \lambda \frac{\partial K_i}{\partial d_i} u_i. \qquad (6)$$

The first two equations use the same matrix to solve for different quantities and require only a single numerical factorization of the stiffness matrix K. Similarly, computing the derivatives of all 36 entries in G needs only a single numerical factorization of the stiffness matrix K. With the gradient, a gradient descent may be performed with a line search and bound constraints to find new microstructures. In some embodiments, a maximum number of gradient steps is set at 500. After convergence or reaching a maximum number of iterations, the material distributions may be thresholded to obtain discrete material assignments. Although the optimization operates in the continuous domain, the resulting microstructures generally exhibit a discrete structure and have material properties that do not change much after thresholding.

Following continuous optimization of the microstructures in act 212, the discrete sampling process 210 is repeated and cycling between discrete sampling and continuous optimization continues until no significant expansion of the gamut is observed or until some other criterion is met (e.g., a computational budget is reached). The output of the material property gamut generation process is a discrete representation 214 of the material properties and the mapping between these properties and the corresponding microstructures.

Figure 3C:
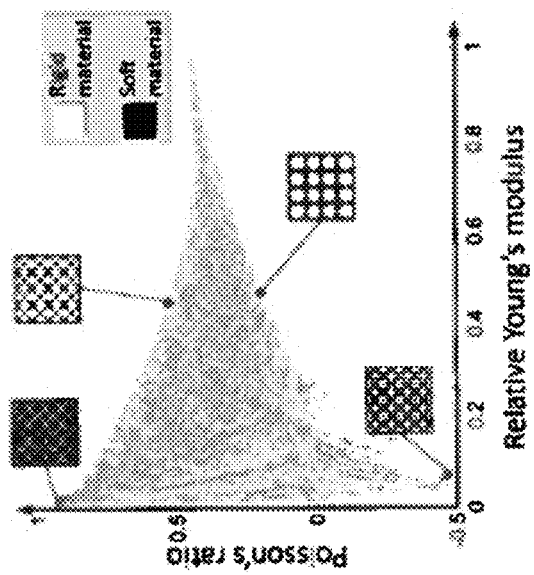
FIGS. 3A-3C illustrate plots associated with a process for calculating a material property gamut in accordance with some embodiments.
Figure 3B:
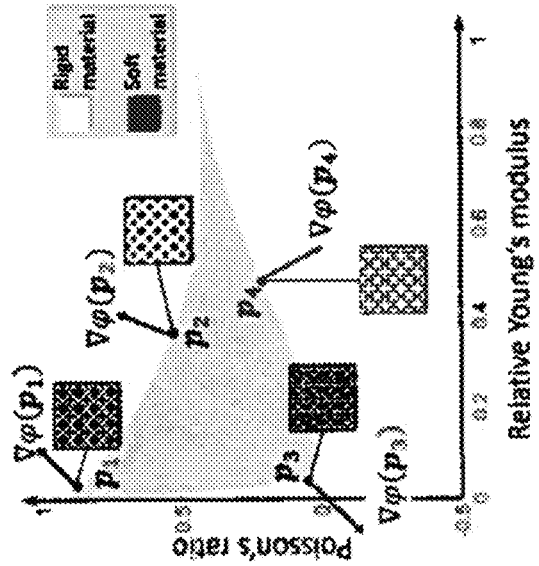
Figure 3A:
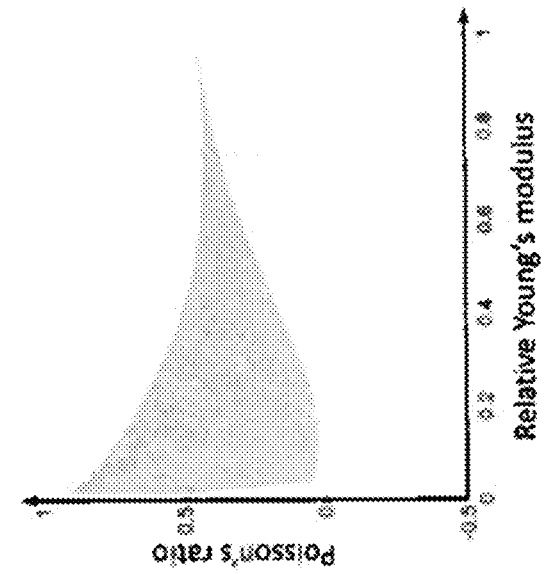

FIGS. 3A-3C shows plots of one cycle of computing a material property gamut for the material properties Poisson's ratio and relative Young's modulus, in accordance with some embodiments. Given a set of samples, a signed distance function is calculated as shown in FIG. 3A. The signed distance function is used to find samples (e.g., samples $p_1$, $p_2$, $p_3$, $p_4$) located close to the boundary of the gamut, as shown in FIG. 3B. FIG. 3B also shows that the gradient of the signed distance function provides new search directions for each of the samples identified using the signed distance function. A discrete search or a continuous optimization based on the identified samples may then be performed, as described above, to find new microstructures outside the current gamut thereby expanding the gamut beyond its current boundaries, as shown in FIG. 3C.

Most available materials for 3D printers are elastic materials. Assuming small deformations, linear elasticity may be used to compute both the mechanical behavior of the entire object and the microstructures. In such a setting, the relation between the linear strain $\varepsilon$ and Cauchy's stress $\sigma$ at every material point is given by:

$$\sigma = \mathcal{E}\epsilon, \qquad (7)$$

where $\mathcal{E}$, the so-called elasticity tensor, can be described by 21 parameters.

Working in such a high dimensional space is prohibitive and therefore materials having a certain number of symmetries, such as orthotropic materials for which the elasticity tensor is defined by 12 parameters (4 parameters for 2D), cubic materials defined by 3 parameters and isotropic materials defined by 2 parameters, are discussed herein for use with some embodiments. For example, the tensor for a cubic structure can be written (using the Voigt notation) as follows:

$$\mathcal{E} = \begin{pmatrix} (1-v)\hat{E} & v\hat{E} & v\hat{E} & & & \\ v\hat{E} & (1-v)\hat{E} & v\hat{E} & & & \\ v\hat{E} & v\hat{E} & (1-v)\hat{E} & & & \\ & & & \mu & & \\ & & & & \mu & \\ & & & & & \mu \end{pmatrix}, \qquad (8)$$

where $\hat{E}=E/((1-2v)(1+v))$, where E is the Young's modulus of the material, $v$ is its Poisson's ratio, and $\mu$ its shear modulus. Alternatively, Lame's parameters can be used to define the tensor $\mathcal{E}$, which in this example has the form:

$$\mathcal{E} = \begin{pmatrix} 2\mu+\lambda & \lambda & \lambda & & & \\ \lambda & 2\mu+\lambda & \lambda & & & \\ \lambda & \lambda & 2\mu+\lambda & & & \\ & & & \mu & & \\ & & & & \mu & \\ & & & & & \mu \end{pmatrix}. \qquad (9)$$

Letting $\mathcal{M}=\mathcal{R}^n$ denote the space of n material properties, each point $p \in \mathcal{M}$ may be written as $[\rho, e]$, where $\rho$ is the density of the material and e are the other material parameters.

Discretization

Using standard finite element techniques, an object may be discretized into regular voxels and its deformed state may be computed when subject to external forces $F_{ext}$ according to the relation:

$$Ku=F_{ext} \qquad (10),$$

where K is the stiffness matrix of the system and u are the displacements at each of the nodes of the voxels. In some embodiments, this same approach is used to simulate both the mechanical behavior of the microstructures in the gamut representation 214 and the object macroscopic behavior, albeit at different scales. To simulate the microstructures, each voxel may be assumed to be made of a homogeneous base material, whereas for determining the large scale behavior of the object, the object's cells may be assumed to correspond to a microstructure whose properties are determined using numerical coarsening. In some embodiments, the static equilibrium in Eq. 10 may be solved using a fast multigrid solver.

Continuous Material Property Gamut Representation

In accordance with some embodiments, the discrete gamut representation of microstructures 214 is transformed into a smooth continuous gamut representation of the material property space to enable constrained topology optimization in the continuous material property space. In some embodiments, the continuous gamut representation is created using a level set field that represents the boundary of the gamut. In other embodiments, the continuous gamut representation may be created using other suitable techniques for providing a smooth continuous representation including, but not limited to, triangulation using a mesh.

In some embodiments, the continuous representation of the material property space is created by constructing a signed distance field from the point cloud in the precomputed material property space 214. To construct the signed distance field when a level set field is used, the level set values may be stored on the cell centers of an n-dimensional Cartesian grid. Each component $\varepsilon_i$ in the material property space may be normalized by a linear interpolation function $\bar{\varepsilon}_i = N(\varepsilon_i)$ to constrain the scope of the level set within an n-dimension unit cube. When a point on the level set is mapped to the material property space, the normalized value may be scaled back. Furthermore, the gradient of the interpolation function may also be considered when evaluating the material property gamut constraint using level set value interpolations.

In some embodiments, the signed distance field is generated from a set of points by assigning an implicit distance function $\varphi(p)$ to each point $p \in \mathcal{M}$. The signed distance field may be initialized using the implicit function $\varphi(p)=\|p-\bar{p}\|-r$, where $\|\square\|$ is the Euclidean distance between two points in $\mathcal{M}$ and $\bar{m}$ is the average position of the neighboring points of p with a distance of r. The level set surface may then be smoothed by solving an explicit mean curvature flow problem $\partial \varphi / \partial t = \Delta \varphi$. For each time step, a fast marching method may be run in a dimension n to reinitialize the signed distance values over the entire domain.

Figure 4:
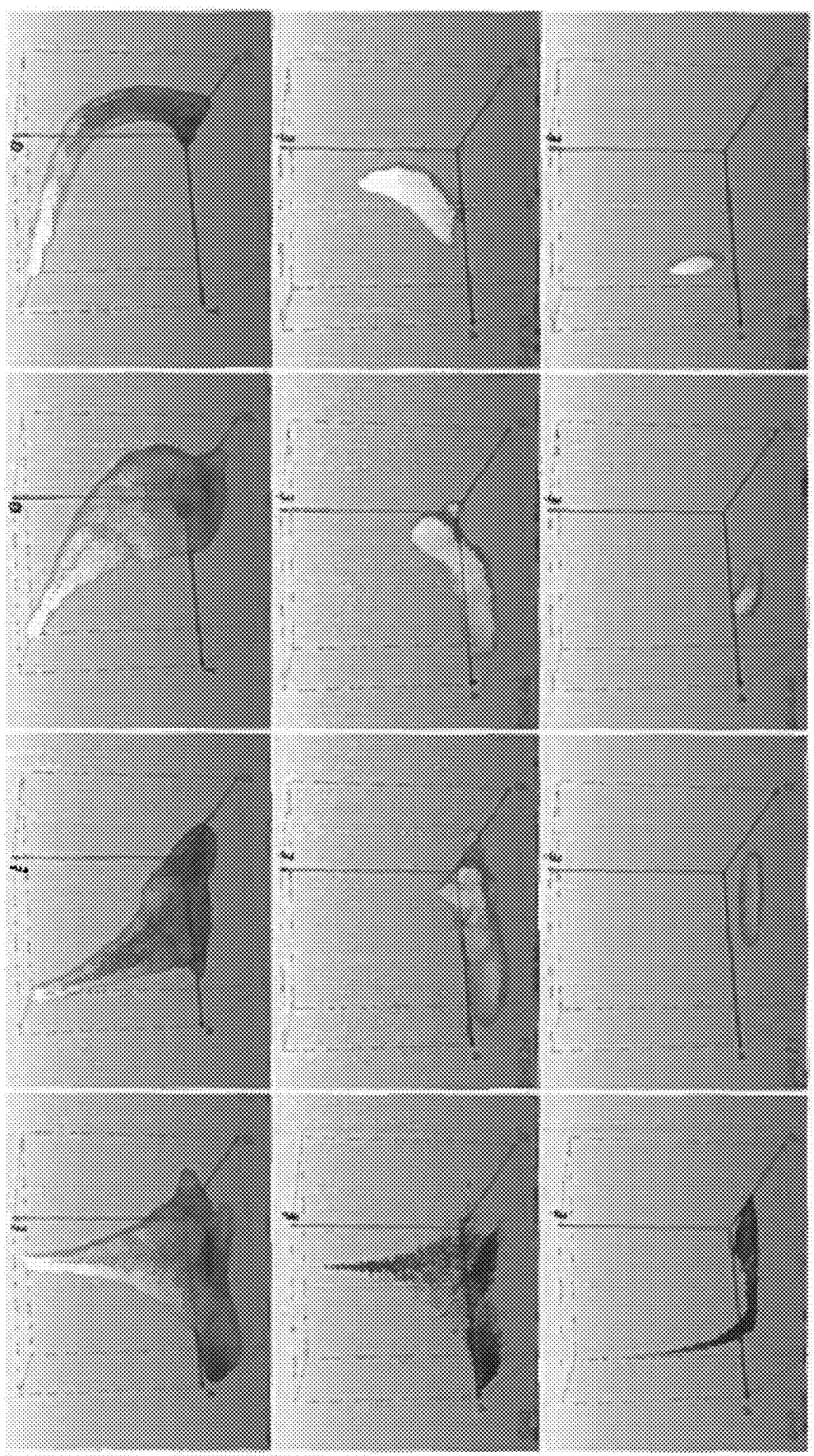
FIG. 4 illustrates plots of level set gamuts that may be used as continuous material property gamuts in accordance with some embodiments.

FIG. 4 shows examples of level set gamuts that may be generated and/or used in accordance with some embodiments. The representations in the top row of FIG. 4 (from left to right) show the 3-dimensional level sets for a 2D isotropic material space parameterized by the density $\rho$, the normalized Young's modulus $\hat{E}$ and the Poisson's ratio $\nu$; for a 3D isotropic material space parameterized by $\rho$, $\hat{E}$ and $\nu$; for a 2D isotropic material space parameterized by the density $\rho$ and the Lamé's parameters; and for a 3D isotropic material space parameterized by the density $\rho$ and the Lamé's parameters. The representations in the middle row of FIG. 4 (from left to right) show a projection of the sample points in the ($\rho$, $\hat{E}$, $\sigma$) material space; and three slices of the 4-dimensional level sets for cubic 2D microstructures in the ($\rho$, $\hat{E}$, $\sigma$) material space. The representations in the bottom row of FIG. 4 (from left to right) show a projection of the sample points in the ($\rho$, $\hat{E}$, $\sigma$) material space; and three slices of the 4-dimensional level sets for cubic 3D microstructures in the ($\rho$, $\hat{E}$, $\sigma$) material space.

In accordance with some embodiments, a topology optimization problem is reformulated directly in the continuous representation of the material property gamut to enable a continuous constrained topology optimization process 220. Such an approach minimizes the objective function over possible material parameters while requiring strict satisfaction of the physics constraints (e.g., static equilibrium) as well as strict satisfaction of the physical parameter bounds. When a level set field is used to create the continuous representation of the material property gamut, the physical parameter bounds constraint can be formulated as limiting the material properties to stay on the negative side of the level set to ensure that the material properties used in the optimization are physically realizable.

Topology Optimization

Some conventional topology optimization problems optimize the shape and structure of a given object defined by a prescribed domain in order to minimize a cost function. For example, the compliance of an object may be minimized while satisfying static equilibrium and total weight constraints. Since the topology of the object is unknown a priori, the shape of the object may be defined through its material distribution and the material densities may be worked with locally. To this end, the three-dimensional model of the design layout may be converted into cells (e.g., 10×10×10 voxel cubes) and a density variable may be assigned to every cell of the discretized layout.

Some embodiments extend conventional topology optimization processes in at least two ways. First, computation of a binary material distribution is not needed, as the database of microstructures represented in the precomputed material property gamut are used to fill each cell of the optimized solution. Leveraging the continuous representation of the material property gamut, each cell is only required to have material properties inside the gamut. Second, the constrained topology optimization process in accordance with some embodiments can be used with more complex parameterizations of the material property space than conventional topology optimization processes, which are usually formulated with a single unknown density for each cell. The continuous constrained topology optimization process 220 in accordance with some embodiments is schematically illustrated in FIG. 2, which shows that both the domain and external conditions related to the object (e.g., a discretized version of the object to be fabricated) and the pre-calculated material property gamut 214 provide constraints on the topology optimization process.

In some embodiments, each cell $c_i$ contains an n-dimensional material parameter $p_i \in \mathcal{R}^n$, where p is used to denote the stacked vector of material parameters in all cells. Given a signed distance function $\Phi(p_i)$ that defines the gamut, a topology optimization problem in accordance with some embodiments is given as follows:

$$\min_{p}: \mathcal{S}(p, u) \quad (11)$$
$$\text{s.t.}: \mathcal{F}(p, u) = 0$$
$$: \Phi(p_i) \leq 0, 1 \leq i \leq N_i,$$

where $\mathcal{S}$ is a real-valued objective function that depends on the material parameters and the displacement vector u of the entire object at the elasticity equilibrium. The equality constraint $\mathscr{F}=0$ requires u to satisfy the elasticity equilibrium and the inequality constraint $\Phi \leq 0$ guarantees that the material properties of each cell stays inside the boundaries of the precomputed gamut.

In the examples described herein, the material parameter p consists of the density $\rho$ and the elasticity parameters e. However, it should be appreciated that any suitable number and combination of material properties may be used as the material parameter p, and embodiments are not limited in this respect. In some embodiments that include density $\rho$ and the elasticity parameters e as material parameter p, the objective function may be split into a density term $\sigma(\rho)$ that controls the overall mass and an elasticity term $\mathcal{C}_d(e,u)$ that controls the deformation behavior. These terms can be weighted for specific topology optimization problems. The density term can be written as:

$$v(\rho) = \left(\sum_{i=1}^{N} \rho_i V_i - \hat{M}\right)^2, \quad (12)$$

where $V_i$ is the cell volume and $\hat{M}$ is the target overall weight. Alternatively, the total weight objective may be treated as an equality constraint. In some embodiments, density is not treated as a special variable. In practice, a very large coefficient can preserve the target overall weight very well, if needed. For particular topology optimization problems, spatially varying weight control terms may be added to the density term above. For example, the target weight of each individual cell may be controlled by adding a logical term $(\rho_s - \hat{\rho}_s)^2 V_i$.

The elasticity constraint may be written as $\mathscr{F}(e,u)=K(e)u-f=0$. The gamut constraint for a point in the material property space may be described by an n-dimensional level set function $\Phi(p)$, where $\Phi(p)<0$ for a point inside the gamut, $\Phi(p)>0$ for a point outside the gamut, and $\Phi(p)=0$ for a point on the boundary of the gamut. The value of $\Phi$ represents the m-dimension Euclidean distance to the level set boundary. In some embodiments, this distance is linearly interpolated from the precomputed signed distance field. The gradient of $\Phi$ can be evaluated by a finite difference operation on the signed distance field.

In some embodiments, two types of objective functions may be used for the elasticity term in the topology optimization process 220. The first type of objective function is target deformation, which relates to controlling the deformation of an object by designing its internal structures. In some embodiments, a vector of the nodal target displacements and the boundary conditions are taken as input to the topology optimization process. Then the optimal material distribution over the object domain is automatically generated to achieve the desired deformation within the range of linear elastic behavior. The deformation objective may be defined as:

$$\mathcal{C}_d(e, u) = (u-\hat{u})^T D(u-\hat{u}), \quad (13)$$

where $\hat{u}$ is a vector of target displacements and D is a diagonal matrix that determines the importance of each nodal displacement. D may be used to define the subset of nodes of interest. For example, most entries of D may be set to zero to focus on a portion of the domain. The weights can also be defined based on cell densities by setting $D_{i,j} = \rho_k^k$ where k is a power index controlling the effect of the cell density on the target deformation.

The second type of objective function is minimum compliance. In minimum compliance, the deformation objective $\mathcal{C}_i$ is defined as the negative elastic potential energy:

$$\mathcal{C}_i(e, u) = u^T K(e) u \quad (14).$$

In some conventional topology optimization problems, the element stiffness matrix $K_i$ depends on the artificial density value x, through an analytical formula such as $K_i = x_i^3 K_D$. In contrast, the stiffness matrix in the minimum compliance objective function in accordance with some embodiments depends only on elasticity parameters such as the Young's modulus and the Poisson's ratio, and the constraint posed by density is enforced through the precomputed material property gamut.

Microstructure Substitution

As discussed above, a 3D printable design may be generated by replacing each cell in the optimized object layout with a microstructure from the material property gamut whose material properties are closest to the continuous material assignment resulting from the topology optimization process. This microstructure substitution process 230 results in a complex, high-resolution multi-material model with optimized functional specifications that may be used as input to a 3D printing process. In some situations, multiple microstructures in the material property gamut may have the same material properties, and one of the multiple microstructures may be selected during microstructure substitution process 230. The microstructure selected for substitution may be selected using any suitable criterion including, but not limited to, a measure of continuity between the microstructure and the microstructures in adjacent cells of the design layout. Additionally, in some embodiments, one or more post-processing steps may be used to provide a printable solution that improves the continuity between adjacent cells of the design layout.

Validation

The microstructure sampling techniques described herein were analyzed for 2D and 3D microstructure gamuts made of one or two materials. For the 2D case, patterns with cubic and orthotropic mechanical behaviors that can be described with four parameters (three elasticity parameters and density) and five parameters (four elasticity parameters and density), respectively, were considered. In 3D, the gamut corresponding to cubic structures with four parameters was computed. In all cases, the size of the lattice for the microstructures was set to 16 voxels in every dimension. Isotropic based materials whose Young's modulus differed by a factor of 100 and having 0.48 as Poisson's ratio were used. For microstructures made of a single material, the softer material was used for the empty cells, and all disconnected components generated during the sampling stage were removed.

Figure 5:
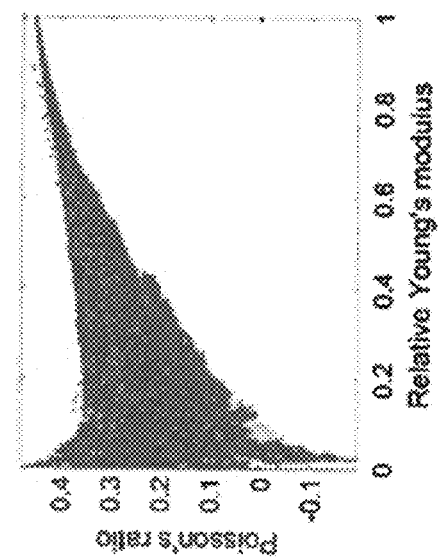
FIG. 5 illustrates examples of material property gamuts calculated using the one or more of the techniques described herein in accordance with some embodiments.
Figure 5:
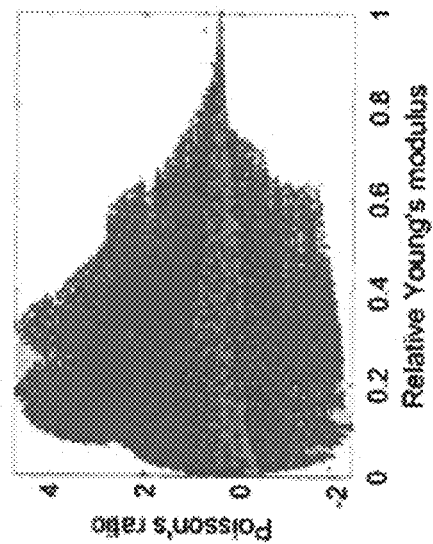
Figure 5:
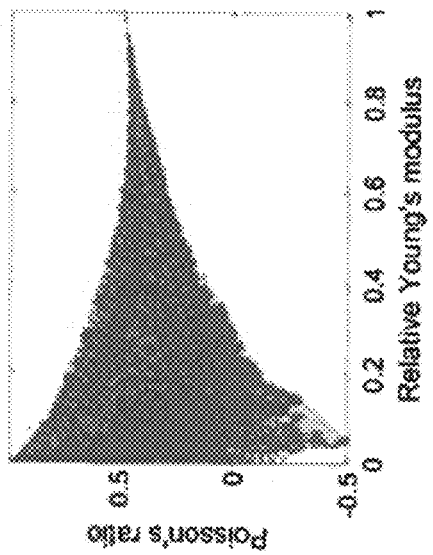

The resulting gamuts are shown in FIG. 5. The gamut on the left of FIG. 5 was computed for 2D cubic structures and contained 274 k microstructures, the gamut in the middle of FIG. 5 was computed for 2D orthotropic structures and contained 388 k microstructures, and the gamut on the right of FIG. 5 was computed for 3D cubic structures and contained 88 k microstructures. Generation of these gamuts took from 15 hours to 93 hours to compute, which correspond to 68, 19 and 5 sampling cycles, respectively. The plots show the results for the projection of the gamuts on the plane defined by the macroscale Young's modulus along the x-axis (normalized by the Young's modulus of the stiffest base material) and the Poisson's ratio corresponding to a contraction along the y-direction when the material is stretched along the x-direction.

A significant increase in the coverage of the material space was observed compared to a conventional approach for generating a material property gamut, even for 2D microstructures where a coarser discretization was used. These results confirm that topology optimization only, while helpful to locally improve the microstructure geometries, is suboptimal when attempting to discover the entire gamut of physical properties. The diversity of microstructures obtained was also much richer than the conventional approach for generating a material property gamut, thereby providing a large set of options for the practical use of microstructures. Additionally, even when no sampling of the interior space of the gamut was explicitly enforced, these areas showed a dense sampling as a result of the randomness of the sampling technique, reducing the need to run costly optimization in these areas.

The continuous constrained topology optimization processes in accordance with some embodiments, were also used to compute a wide variety of models in different settings. The sizes and computation times of the resulting models are outlined in Table 1 below.

TABLE 1

List of optimized models with microstructures.

| Example | | Grid Size | # Voxels | Material Space | Time per FEM Solve [s] | Time per step [s] |
|---|---|---|---|---|---|---|
| Deformation | Beam | 96 × 24 × 4 | 38M | cubic/iso | .7 | 5 |
| | Flexure | 32 × 32 × 16 | 67M | iso | 1 | 12 |
| | Gripper | 64 × 32 × 8 | 67M | cubic/iso | 1.7 | 10 |
| Compliance | Bunny | 32 × 32 × 32 | 134M | cubic | .6 | 4 |
| | Bridge | 128 × 64 × 32 | 1074M | iso | 27 | 81 |

Since a line search is performed at each gradient step, it may take multiple simulations to take one step. The average time required for taking a step is shown in the last column of Table 1. On average, it took two hundred iterations to find a local minimum, though it may be possible to improve the speed further by using different optimization routines.

Figure 6:
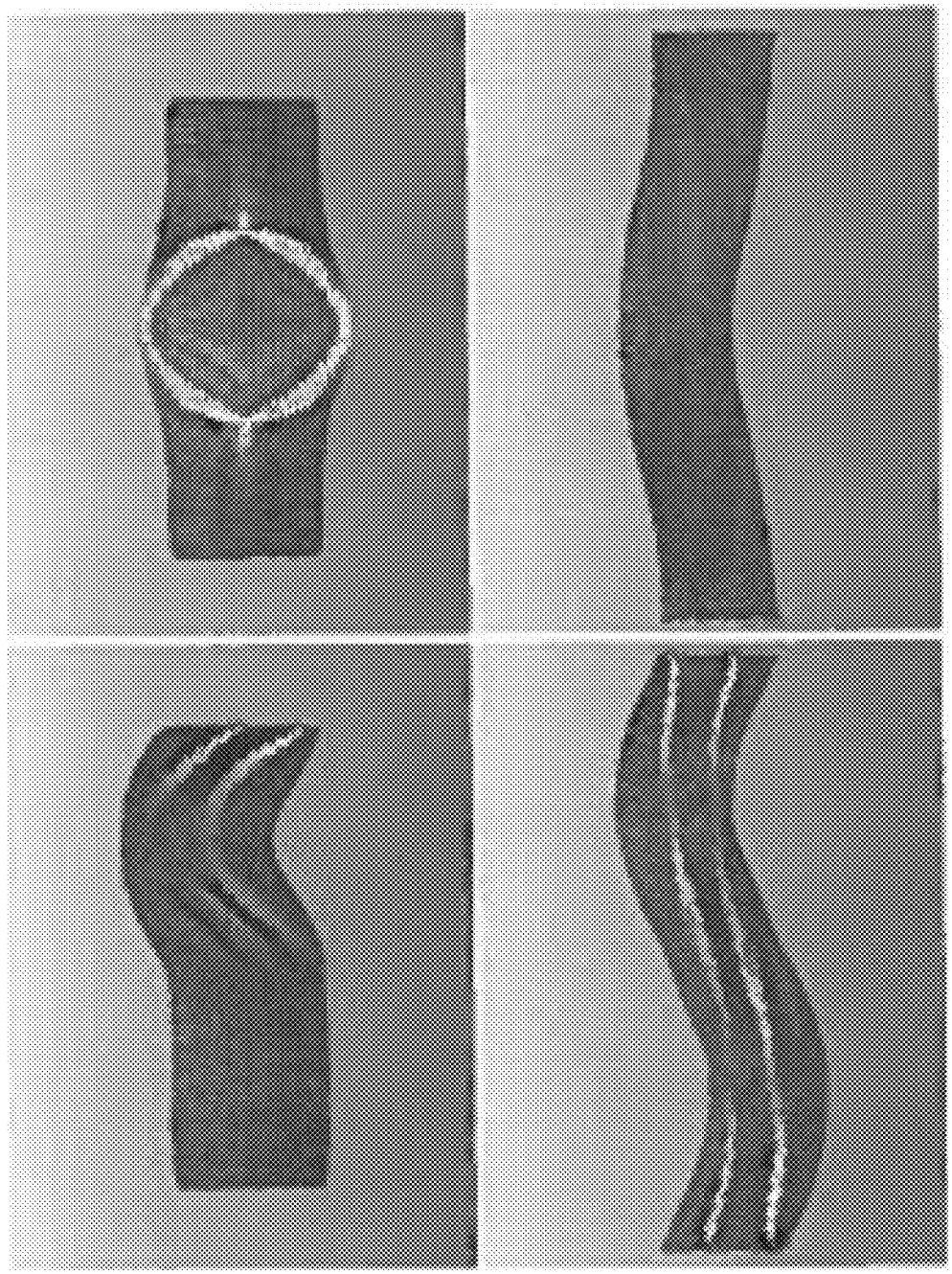
FIG. 6 illustrates plots of a simulation with a beam object in accordance with some embodiments.

Small-scale tests were used to validate the topology optimization techniques described herein. Beams were computed to match different target poses. FIG. 6 shows four optimized beams with different deformation targets. The top two beams achieve their target states under squeezing and the bottom row of beams uses stretching. The beam was squeezed or stretched by setting Dirichlet boundary conditions on its two sides. The optimization was run on an isotropic Lame space and the target volume was selected to be 0.2.

Figure 7:
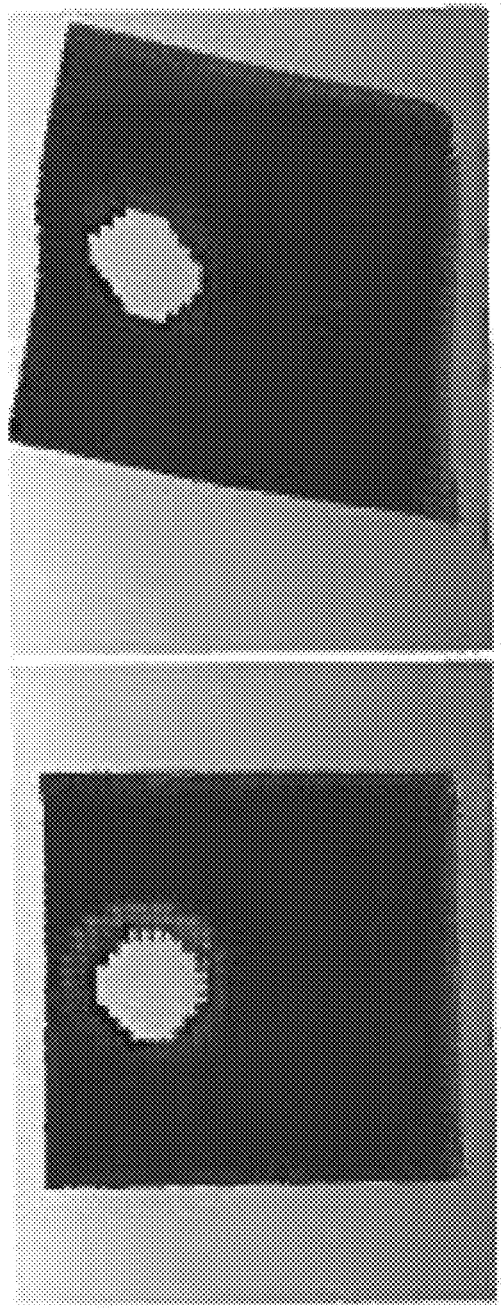
FIG. 7 illustrates plots of a simulation with a flexure mount object in accordance with some embodiments.
Figure 7:
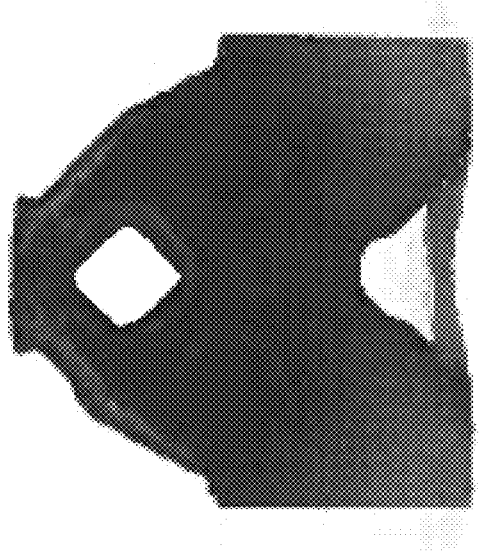
Figure 7:
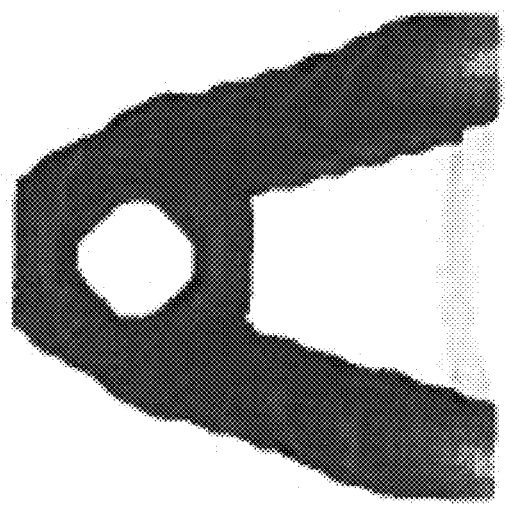

A first set of examples was designed using the target deformation objective. FIG. 7 shows the design and optimization of a flexure mount structure with two deformation targets. The design goal of the structure was to design a flexure that resists vertical loads while remaining complaint in the horizontal direction. The top of the flexure was fixed to be a circular shape so that other parts could be mounted as shown in the top left portion of FIG. 7. Two sets of external forces were applied to the circle. Under a vertical load, the flexure should stay close to the rest shape while under horizontal load the flexure should deform according to the top right portion of FIG. 7. The bottom left and right portions of FIG. 7 show two fabricated flexure designs with different target overall weights.

Figure 8:
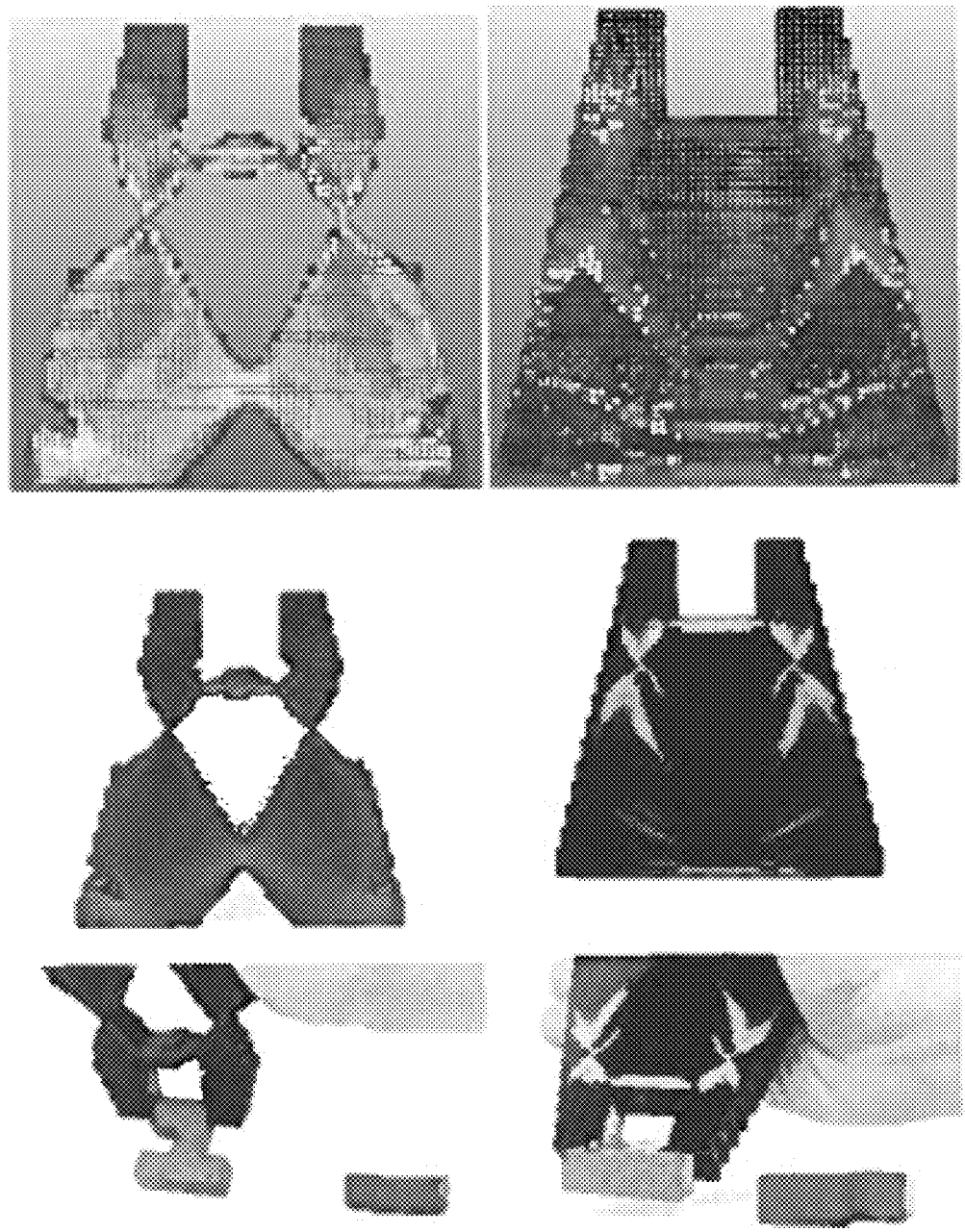
FIG. 8 illustrates plots of a simulation with a gripper object in accordance with some embodiments.

FIG. 8 illustrates designs of different gripper structures generated using the topology optimization techniques described herein. The design goal was to achieve the grasping deformation of the head of the gripper when a user pressed the two ends. Use of the topology optimization technique in accordance with some embodiments enabled the automatic design of complex 3D structures composed of a variety of microstructures that can achieve the target deformation. By changing the parameter of the desired volume, different designs relying on either in-plane deformation (left column of FIG. 8) or out-of-plane bending (right column of FIG. 8) that can both achieve the same target motion were produced.

Figure 9:
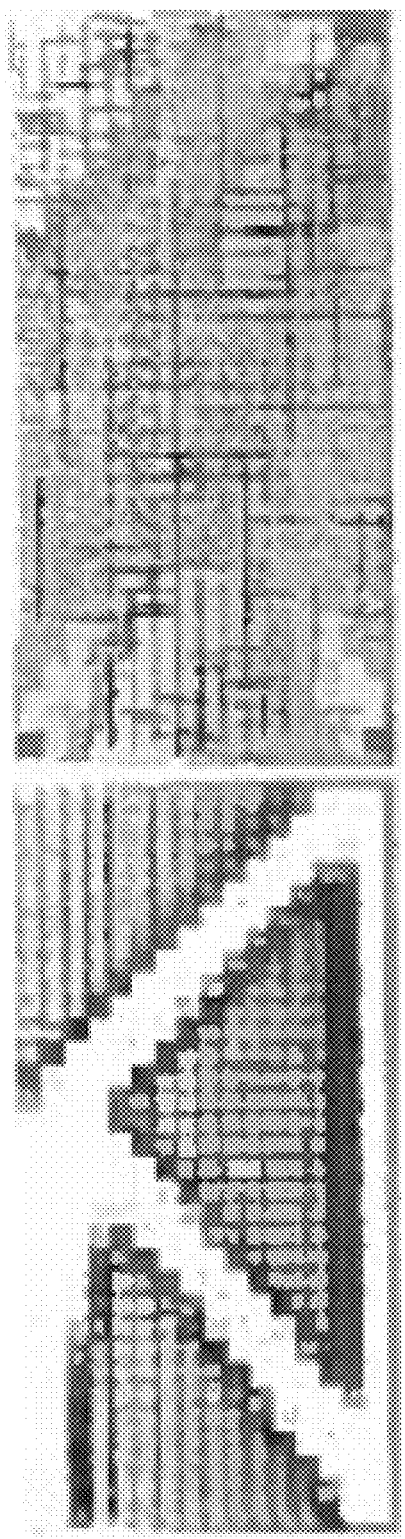
FIG. 9 illustrates a comparison between structures generated using a SIMP-based topology optimization process and a topology optimization process performed in accordance with some embodiments.

The efficacy and scalability of the topology optimization technique described herein on solving the minimum compliance problem was demonstrated by designing and fabricating different objects. The technique was validated on classic topology optimization problems such as cantilever beam and bridge. When the topology optimization technique was restricted to using only the density and Young's modulus as optimization variables, the technique was able to find the same solution as a conventional solid isotropic material with penalisation (SIMP)-based topology optimization technique. This was expected since conventional techniques use the boundary of an artificial stiffness-density curve controlled by the power index. When the Poisson's ratio was added as an optimization variable, the minimum compliance objective function reached 10% lower energy than the conventional technique. As the parameter space was increased to include cubic materials, the advantage over the conventional technique was increased to 15% as shown in FIG. 9. The left plot in FIG. 9 shows structures generated with a conventional SIMP-based topology optimization technique and the right plot in FIG. 9 shows structures generated using the topology optimization technique described herein.

Figure 10:
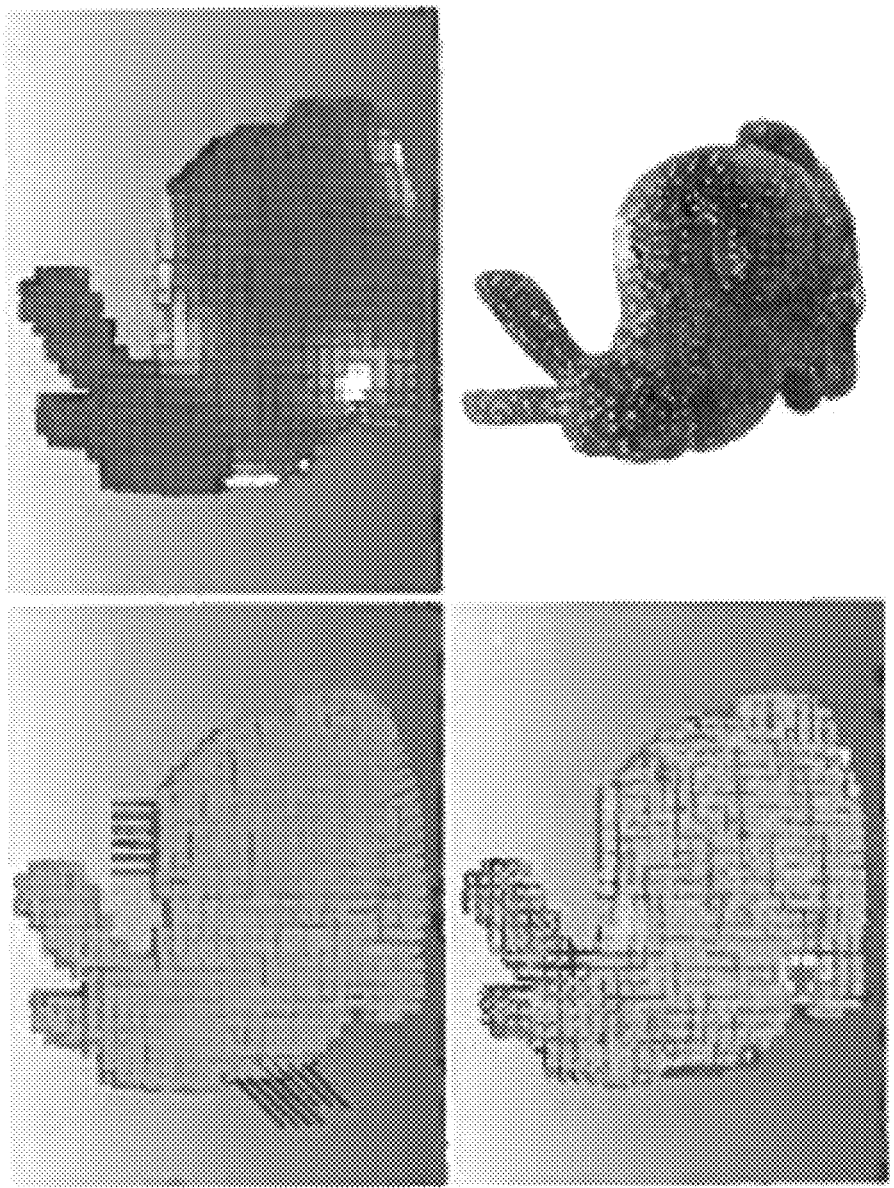
FIG. 10 illustrates plots of a simulation with a bunny object in accordance with some embodiments.

To demonstrate the scalability of the topology optimization technique described herein, the technique was used on a Stanford bunny to minimize the object's compliance under two different external loads, as shown in FIG. 10. The two sets of external forces were applied to the back and chest of the bunny as shown in the top left portion of FIG. 10. Material parameters were computed and color coded where lighter colors indicate larger parameter values as shown in the top right portion of FIG. 10. The nearest microstructures were substituted as shown in the bottom left of FIG. 10 to create the optimized design, and the model shown in the bottom right of FIG. 10 was fabricated.

Figure 11:
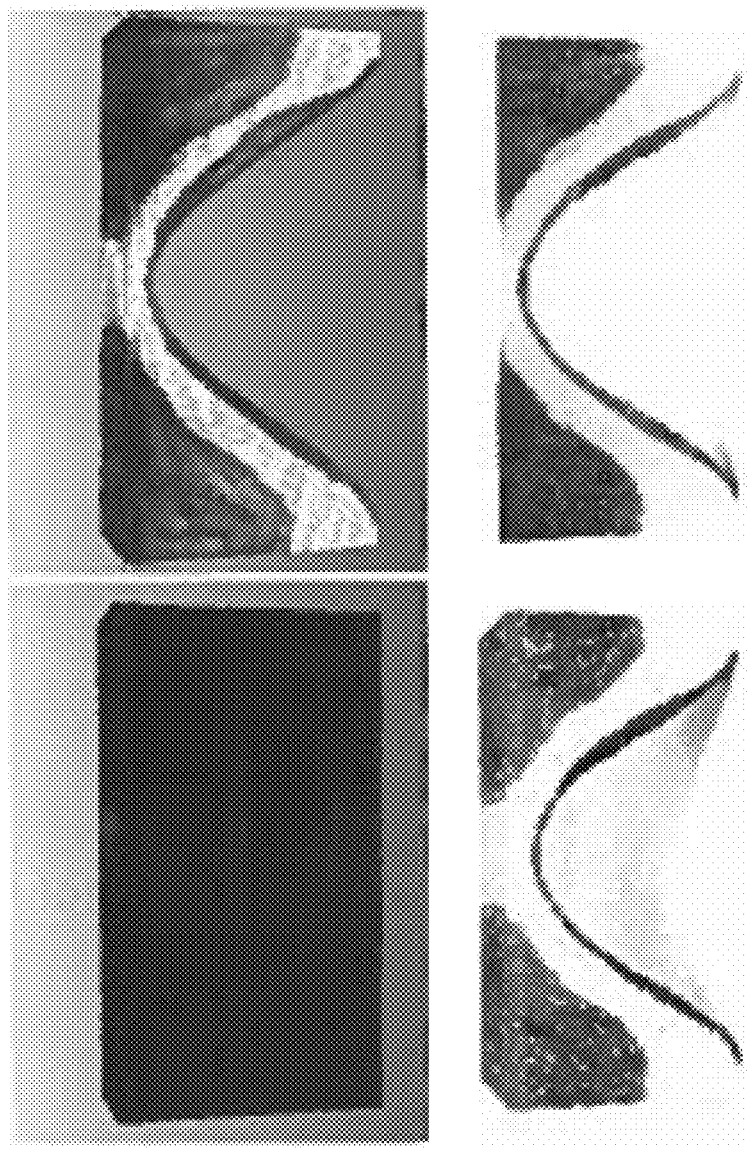
FIG. 11 illustrates plots of a simulation with a bridge object in accordance with some embodiments.

FIG. 11 shows the design of a bridge structure within a rectangular volume using the topology optimization technique described herein. A grid with 500 k cells, which corresponds to one billion voxels after substitution of the microstructures for each cell was used. As shown in the upper left portion of FIG. 11, the initial volume was a 128×64×32 regular grid. A uniform downward loading force was applied and the material parameters were computed and the cells with extremely low stiffness were set to be void material as shown in the top right portion of FIG. 11. Appropriate microstructures were substituted as shown in the lower left portion of FIG. 11 and the bridge structure shown in the lower right portion of FIG. 11 was 3D printed.

Although discussed in the context of 3D printing applications, the topology optimization techniques described herein can be applied to a large variety of optimization problems and embodiments are not limited in this respect.

Figure 12:
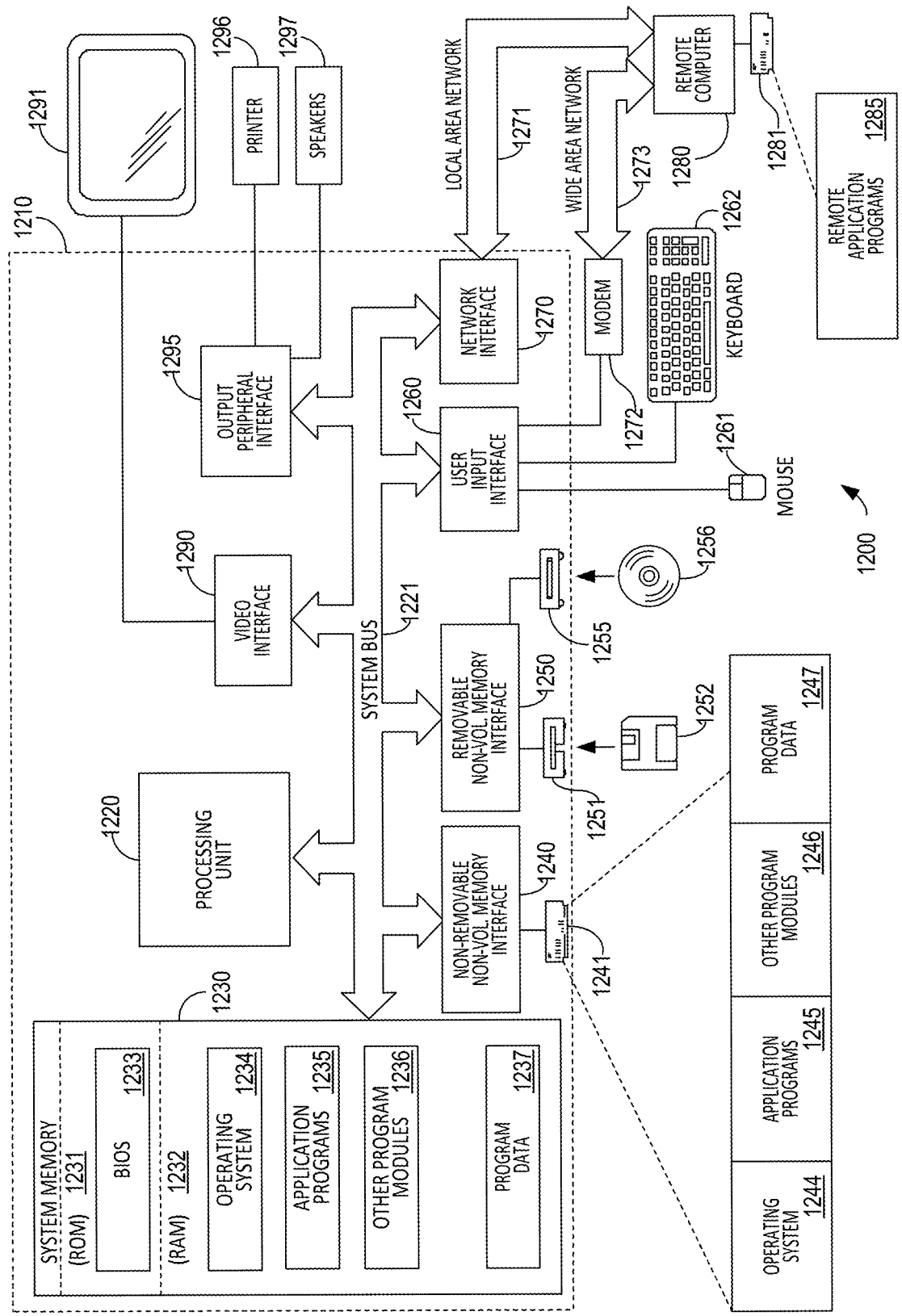
FIG. 12 illustrates an example of a computing system environment on which some embodiments may be implemented.

FIG. 12 illustrates an example of a suitable computing system environment 1200 on which aspects of the invention may be implemented. For example, the computing system environment 1200 may be used to determine the supportedness of one or more regions of an object, to generate a support structure for an object, to generate support tips for a support structure, to indicate the supportedness of one or more regions of an object via a graphical user interface, to interface with one or more devices to effect additive fabrication of an object and/or a support structure, or any combinations thereof. Such a computing environment may represent a home computer, a tablet, a mobile device, a server and/or any another computing device.

The computing system environment 1200 is only one example of a suitable computing environment and is not intended to suggest any limitation as to the scope of use or functionality of the invention. Neither should the computing environment 1200 be interpreted as having any dependency or requirement relating to any one or combination of components illustrated in the exemplary operating environment 1200.

Aspects of the invention are operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 12 an exemplary system for implementing aspects of the invention includes a general purpose computing device in the form of a computer 1210. Components of computer 1210 may include, but are not limited to, a processing unit 1220, a system memory 1230, and a system bus 1221 that couples various system components including the system memory to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 1210 typically includes a variety of non-transitory computer readable media. Computer readable media can be any available media that can be accessed by computer 1210 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 1210. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer information between elements within computer 1210, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237.

The computer 1210 may also include other removable/non-removable, volatile/nonvolatile computer storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through an non-removable memory interface such as interface 1240, and magnetic disk drive 1251 and optical disk drive 1255 are typically connected to the system bus 1221 by a removable memory interface, such as interface 1250.

The drives and their associated computer storage media discussed above and illustrated in FIG. 12, provide storage of computer readable instructions, data structures, program modules and other data for the computer 1210. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the computer 1210 through input devices such as a keyboard 1262 and pointing device 1261, commonly referred to as a mouse, trackball or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port or a universal serial bus (USB). A monitor 1291 or other type of display device is also connected to the system bus 1221 via an interface, such as a video interface 1290. In addition to the monitor, computers may also include other peripheral output devices such as speakers 1297 and printer 1296, which may be connected through a output peripheral interface 1295.

The computer 1210 may operate in a networked environment using logical connections to one or more remote computers, such as a remote computer 1280. The remote computer 1280 may be a personal computer, a server, a router, a network PC, a peer device or other common network node, and typically includes many or all of the elements described above relative to the computer 1210, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computer networks, intranets and the Internet.

When used in a LAN networking environment, the computer 1210 is connected to the LAN 1271 through a network interface or adapter 1270. When used in a WAN networking environment, the computer 1210 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the computer 1210, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computers may be used.

The various methods or processes outlined herein may be implemented in any suitable hardware. Additionally, the various methods or processes outlined herein may be implemented in a combination of hardware and of software executable on one or more processors that employ any one of a variety of operating systems or platforms. Any suitable combination of hardware and software may be employed to realize any of the embodiments discussed herein.

In this respect, various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, implement the various embodiments of the present invention. The non-transitory computer-readable medium or media may be transportable, such that the program or programs stored thereon may be loaded onto any computer resource to implement various aspects of the present invention as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present invention need not reside on a single computer or processor, but may be distributed in a modular fashion among different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Having herein described several embodiments, several advantages of embodiments of the present application should be apparent. One advantage is that an object may be designed based on any number of available materials such that the object, when fabricated, exhibits one or more desired properties. A non-limiting list of applications for which embodiments described herein may be used include optics, mechanical engineering, industrial design, aerospace design, musical instruments, toys and games, and combinations thereof.

Furthermore, the techniques described herein may, in some embodiments, provide in an approach to designing an object that is modular, extensible, independent of object geometry and/or independent of a fabrication device which may be used to subsequently fabricate the object. In some embodiments, a design of an object may be determined independently of a type of fabrication device that may be subsequently used to fabricate the designed object. For example, while one or more material properties may be provided as input to the design process, these materials may not uniquely correspond to a particular fabrication device or fabrication process.

Various inputs to the design of a three-dimensional object have been discussed above, and it will be appreciated that any number of inputs may be considered in designing an object using the techniques described herein. A non-limiting list of suitable inputs may include an input shape (e.g., a geometrical object), one or more desired properties of the object to be designed, a simulation configuration (e.g., the number and type of simulations, the parameters describing a composition of the object that are associated with each simulation, etc.), one or more materials from which the object may be fabricated, one or more properties of the one or more materials (e.g., mechanical properties, cost, weight/density, thermal properties, electrical properties, etc.), details on a fabrication technique (e.g., specifications of an additive fabrication system, such as a resolution; time to fabrication based on an object composition), or combinations thereof.

An input shape may be described using any suitable format, including any data that defines a three-dimensional geometry (e.g., by defining positions of vertices, normals and/or faces). A non-limiting list of suitable formats for an input shape may include STereoLithography (STL), Wavefront OBJ, Additive Manufacturing File Format (AMF), ObjDF, Stratasys SLC, Zmodeler Z3D, Lightwave LWO, Autodesk Maya and/or 3D Studio Max, etc.

While techniques described herein have, in some cases, been described as designing an object suitable for use in additive fabrication, it will be appreciated that the techniques described herein are not limited to designing objects to be fabricated using additive fabrication, and may be used to design an object completely independent of whether any subsequent fabrication of the object might occur. For example, the techniques described herein may be used to design an object that is not fabricated, which may be useful, for example, for a designer to explore how an object might be designed without taking the step of physically fabricating the object. In use cases in which an object designed using one or more of the techniques described herein is fabricated, any suitable type of fabrication approach may be used including, but not limited to, additive fabrication (including stereolithography, selective or fused deposition modeling, direct composite manufacturing, laminated object manufacturing, selective phase area deposition, multi-phase jet solidification, ballistic particle manufacturing, particle deposition, laser sintering, polyjet, or combinations thereof), computer numerical control (CNC) machining, or any combination thereof.

Various inventive concepts may be embodied as one or more methods, of which examples have been provided. The acts performed as part of any method described herein may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein, unless clearly indicated to the contrary, should be understood to mean "at least one."

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

What is claimed is:

1. A system for optimizing a three-dimensional model representing a shape of an object to be fabricated from a plurality of materials having known physical properties, wherein the object is designed to exhibit one or more target properties, wherein the three-dimensional model includes a plurality of cells, each of the plurality of cells being a volume inside the three-dimensional model, the system comprising:
at least one processor programmed to:
perform a computation process to compute information for a material property gamut of microstructures for the plurality of materials by estimating a gamut of material properties covered by possible microstructures made by spatial arrangement of the plurality of materials;
perform a topology optimization process on the three-dimensional model to generate an optimized model, wherein the topology optimization process assigns material properties to each of the plurality of cells inside the three-dimensional model and is constrained based, at least in part, on the information for the material property gamut of microstructures output from the computation process; and
generate a manufacturable design for the object by substituting for each cell of the optimized model, a microstructure from the material property gamut of microstructures, wherein the substituted microstructure has physical properties similar to the material properties assigned to the cell by the topology optimization process.

2. The system of claim 1, wherein the at least one processor is further programmed to: determine a mapping between each of the microstructures in the material property gamut and two or more physical properties of the plurality of materials, and wherein substituting a microstructure from the material property gamut of microstructures comprises substituting the microstructure based on the mapping.

3. The system of claim 1, wherein a precomputed the material property gamut of microstructures is a continuous representation of the material property gamut, and wherein performing a topology optimization process comprises:
formulating a continuous objective function; and
optimizing the continuous objective function constrained by the material properties represented in the continuous representation of the material property gamut.

4. The system of claim 3, wherein the continuous representation of the material property gamut is a level set representation.

5. The system of claim 1 wherein computing the information for the material property gamut of microstructures comprises alternating a discrete sampling process and a continuous optimization process to expand boundary of the material property gamut.

6. The system of claim 1, wherein the material property gamut of microstructures output from the computation process is a discrete representation of the material property gamut, and wherein the at least one processor is further programmed to:
generate a continuous representation of the material property gamut;
wherein performing a topology optimization process comprises performing the topology optimization process based, at least in part, on the continuous representation of the material property gamut.

7. A non-transitory computer-readable medium comprising instructions that, when executed, perform a method of optimizing a three-dimensional model representing a shape of an object to be fabricated from a plurality of materials having known physical properties, wherein the object is designed to exhibit one or more target properties, wherein the three-dimensional model includes a plurality of cells, each of the plurality of cells being a volume inside the three-dimensional model, the method comprising:
performing a computation process to compute information for a material property gamut of microstructures for the plurality of materials by estimating a gamut of material properties covered by possible microstructures made by spatial arrangement of the plurality of materials;
performing a topology optimization process on the three-dimensional model to generate an optimized model, wherein the topology optimization process assigns material properties to each of the plurality of cells inside the three dimensional model and is constrained based, at least in part, on the information for the material property gamut of microstructures output from the computation process; and
generating a manufacturable design for the object by substituting for each cell of the optimized model, a microstructure from the material property gamut of microstructures, wherein the substituted microstructure has physical properties similar to the material properties assigned to the cell by the topology optimization process.

8. The non-transitory computer-readable medium of claim 7, wherein the method further comprises determining a mapping between each of the microstructures in the material property gamut and two or more physical properties of the plurality of materials, and wherein substituting a microstructure from the material property gamut of microstructures comprises substituting the microstructure based on the mapping.

9. The non-transitory computer-readable medium of claim 7, wherein the material property gamut of microstructures is a continuous representation of the material property gamut, and wherein performing a topology optimization process comprises:
formulating a continuous objective function; and
optimizing the continuous objective function constrained by the material properties represented in the continuous representation of the material property gamut.

10. The non-transitory computer-readable medium of claim 9, wherein the continuous representation of the material property gamut is a level set representation.

11. The non-transitory computer-readable medium of claim 7, wherein computing the information for the material property gamut of microstructures comprises alternating a discrete sampling process and a continuous optimization process to expand boundary of the material property gamut.

12. The non-transitory computer-readable medium of claim 7, wherein the material property gamut of microstructures output from the computation process is a discrete representation of the material property gamut, and wherein the method further comprises:
generating a continuous representation of the material property gamut;
wherein performing a topology optimization process comprises performing the topology optimization process based, at least in part, on the continuous representation of the material property gamut.

13. A method of optimizing a three-dimensional model representing a shape of an object to be fabricated from a plurality of materials having known physical properties, wherein the object is designed to exhibit one or more target properties, wherein the three-dimensional model includes a plurality of cells, each of the plurality of cells being a volume inside the three-dimensional model, the method comprising:
performing a computation process to compute information for a material property gamut of microstructures for the plurality of materials by estimating a gamut of material properties covered by possible microstructures made by spatial arrangement of the plurality of materials;
performing a topology optimization process on the three-dimensional model to generate an optimized model, wherein the topology optimization process assigns material properties to each of the plurality of cells inside the three dimensional model and is constrained based, at least in part, on the information in the received data structure and the one or more target properties; and
generating a printable design for the object by substituting for each cell of the optimized model, a microstructure from the material property gamut of microstructures, wherein the substituted microstructure has physical properties similar to the material properties assigned to the cell by the topology optimization process.

14. The method of claim 13, wherein the material property gamut of microstructures is a continuous representation of the material property gamut, and wherein performing a topology optimization process comprises:
formulating a continuous objective function; and optimizing the continuous objective function constrained by the material properties represented in the continuous representation of the material property gamut.

15. The method of claim 14, wherein the continuous representation of the material property gamut is a level set representation.

16. The system of claim 1, wherein computing information for the material property gamut of microstructures comprises introducing discrete changes in the materials of the microstructures to expand boundaries of the material property gamut of microstructures.

17. The non-transitory computer-readable medium of claim 7, wherein computing information for the material property gamut of microstructures comprises introducing discrete changes in the materials of the microstructures to expand boundaries of the material property gamut of microstructures.

18. The method of claim 13, wherein computing information for the material property gamut of microstructures comprises introducing discrete changes in the materials of the microstructures to expand boundaries of the material property gamut of microstructures.

19. The system of claim 1, wherein assigning material properties to each of the plurality of cells inside the three-dimensional model comprises assigning mechanical properties to each of the plurality of cells.

20. The method of claim 13, wherein assigning material properties to each of the plurality of cells inside the three-dimensional model comprises assigning mechanical properties to each of the plurality of cells.

* * * * *

UNITED STATES PATENT AND TRADEMARK OFFICE
CERTIFICATE OF CORRECTION

PATENT NO. : 10,850,495 B2  
APPLICATION NO. : 15/418528  
DATED : December 1, 2020  
INVENTOR(S) : Wojciech Matusik et al.

Page 1 of 1

It is certified that error appears in the above-identified patent and that said Letters Patent is hereby corrected as shown below:

In the Claims

At Column 21, Claim 3, Line 8, "wherein a precomputed the" should read --wherein the--

At Column 21, Claim 5, Line 19, "claim 1" should read --claim 1,--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*